J. B. & E. G. MOORE.
Apparatus for Unloading Stone.
No. 83,721.
Patented Nov. 3, 1868.
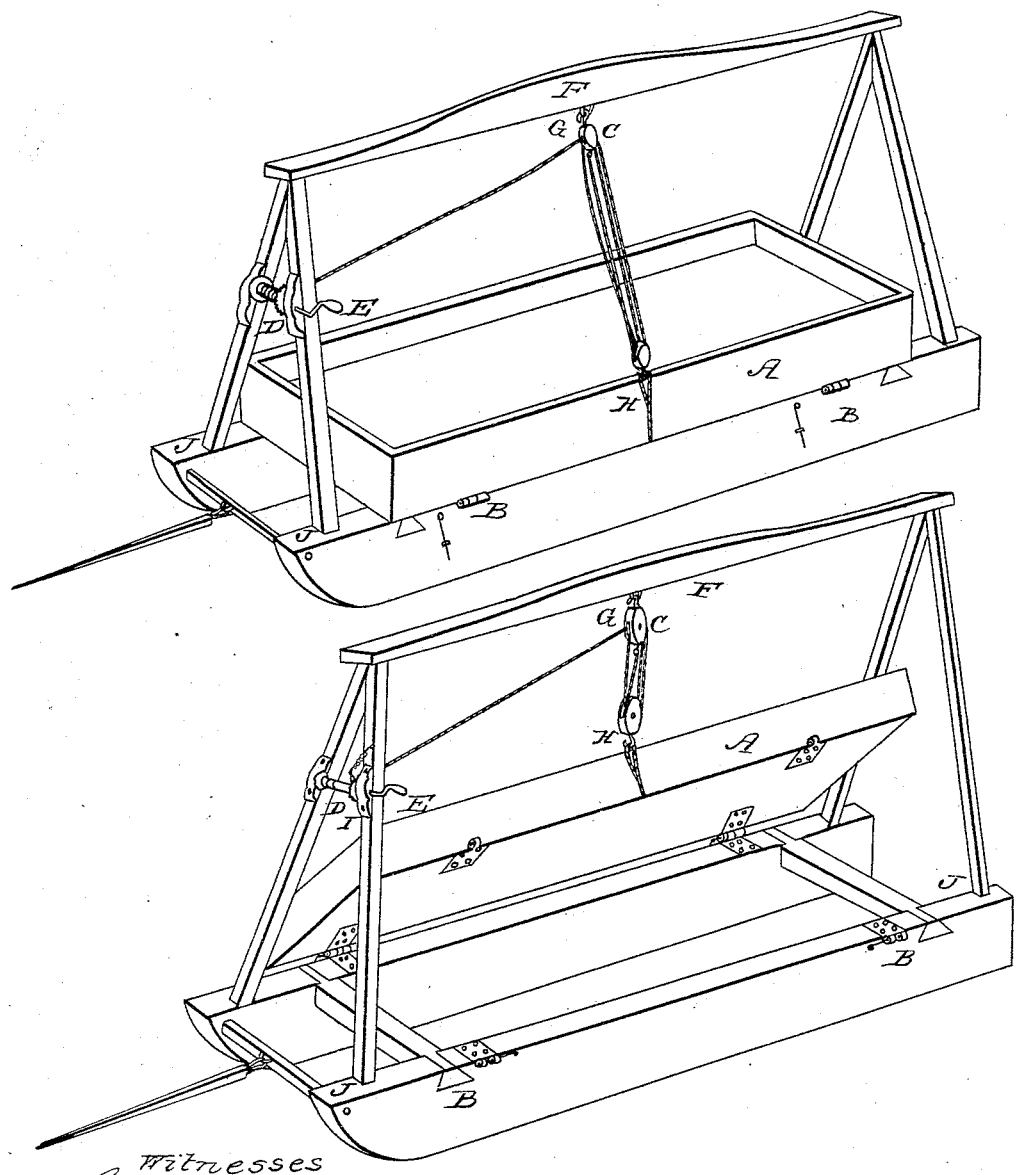

JOSHUA B. MOORE AND ERWIN G. MOORE, OF McDONOUGH, NEW YORK.

Letters Patent No. 83,721, dated November 3, 1868.

IMPROVED APPARATUS FOR UNLOADING STONE.

The Schedule referred to in these Letters Patent and making part of the same.

*To all whom it may concern:*

Be it known that we, JOSHUA B. MOORE and ERWIN G. MOORE, of McDonough, in the county of Chenango, in the State of New York, have invented a new and improved Apparatus for Unloading Stone, or other material, from a sled, or wagon, or other vehicle; and we do hereby declare that the following is a full and exact description thereof, reference being had to the accompanying drawings, and to the letters of reference marked thereon, making a part of this specification.

The nature of our invention consists in a movable platform or low box, of any desired form, for the purpose, placed upon a sled, or wagon, or any other vehicle, by which stone or other material is moved from one place to another, said platform being so constructed, and provided with hinges upon each side in such a manner, that the platform can be raised on either side, when loaded, by the aid of a tackle attached to an elevated frame, and to said platform, which is operated by a windlass, so that a load of stone or other material can be unloaded in bulk.

To enable others skilled in the art to make and use our invention, we will proceed to describe its construction and operation, reference being had to the accompanying drawings.

We construct a sled, or wagon, or other vehicle, in any of the usual forms used for drawing stone or other heavy material, and add thereunto a movable platform, A, (or low box of any desired form to answer the purpose,) which is provided with hinges B on each side, in such a manner that the platform A can be raised on either side. We also construct upon said sled or wagon an elevated frame, F, over the platform A, said frame being attached to the sled or wagon as shown at J J. To said frame, at hook G, is attached a tackle, C, which is also connected to the platform A at loop H, the rope passing around the windlass D, and is operated by the crank E, and secured by the ratchet and pawl I, when it is desired to have the platform A remain elevated.

What we claim as our invention, and desire to secure by Letters Patent, is—

The movable platform A, so attached to a wagon or sled that it may tilt from either side, in combination with frame F, tackle C, and windlass D, all constructed, arranged, and operated, substantially as and for the purpose described.

JOSHUA B. MOORE.
ERWIN G. MOORE.

Witnesses:
C. H. ECCLESTON,
C. BENNETT, Jr.